March 25, 1924.
C. J. McNERNY
1,488,017
BRAKE MECHANISM
Filed Sept. 25, 1920
2 Sheets-Sheet 1
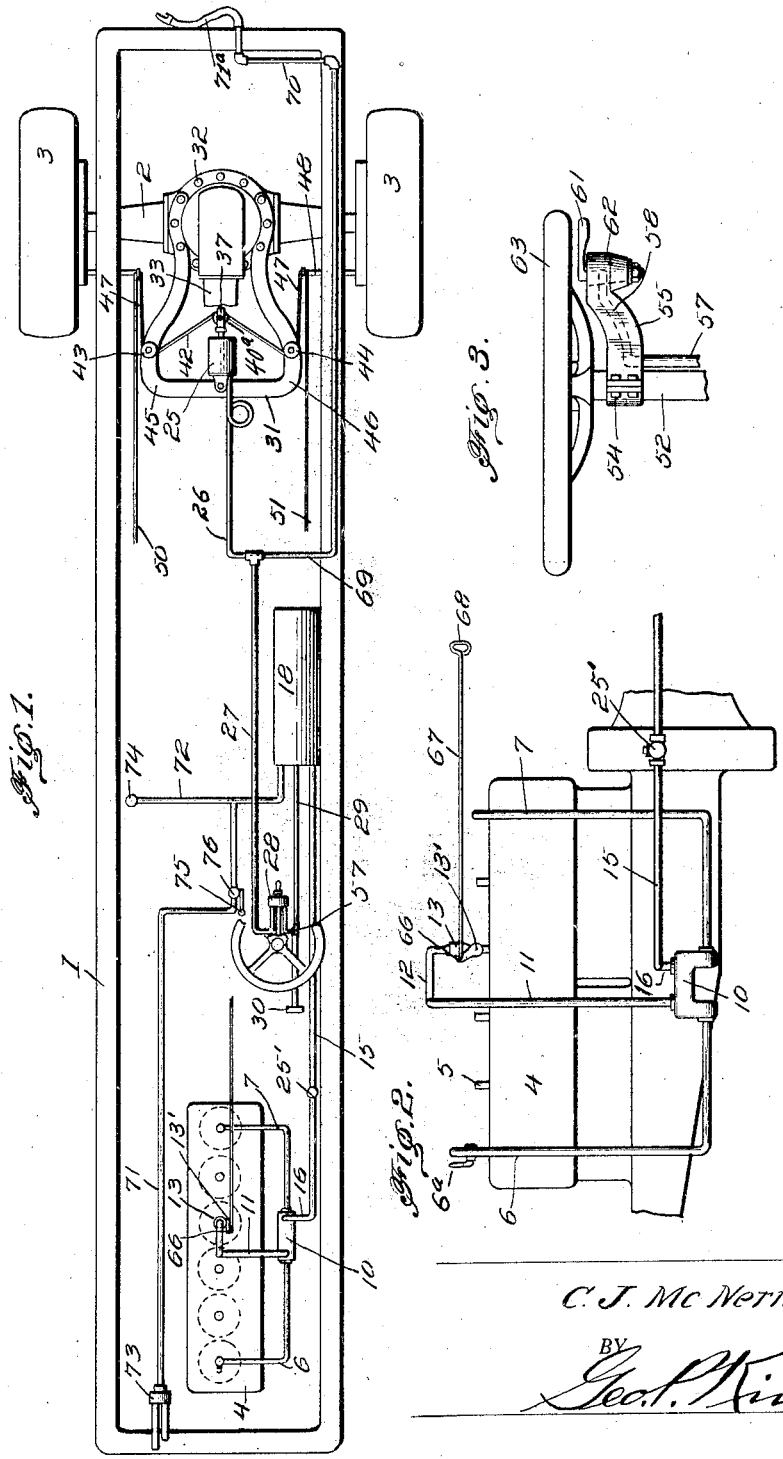
INVENTOR.
C. J. McNerny.
BY
Geo. P. Kimmel
ATTORNEY.

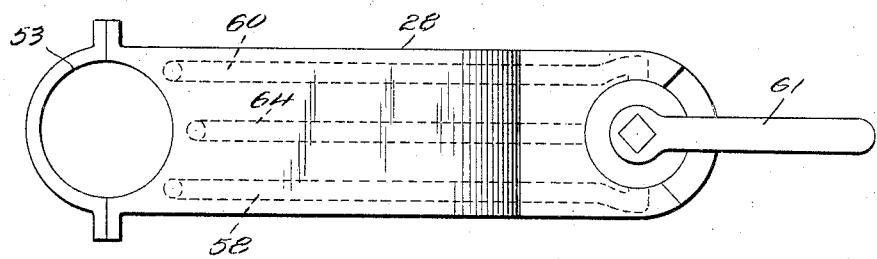
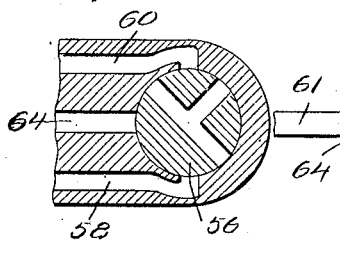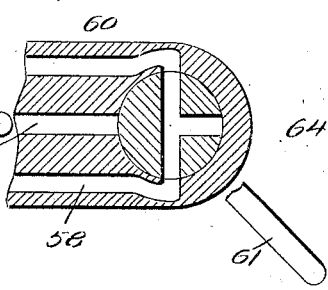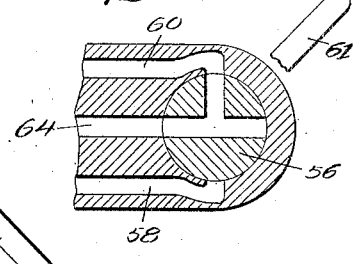
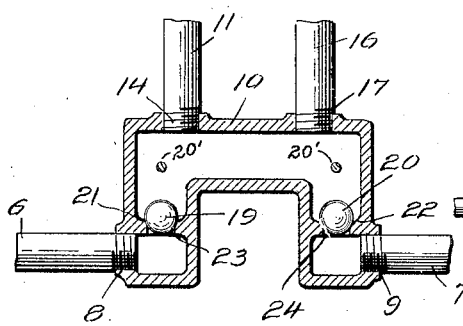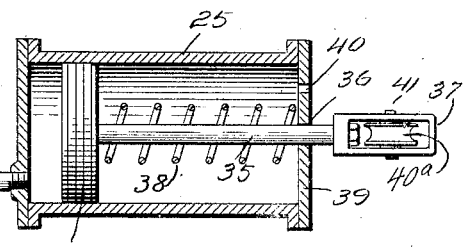

Patented Mar. 25, 1924.

1,488,017

UNITED STATES PATENT OFFICE.

CLYDE JOHN McNERNY, OF CHATTANOOGA, TENNESSEE.

BRAKE MECHANISM.

Application filed September 25, 1920. Serial No. 412,719.

*To all whom it may concern:*

Be it known that I, CLYDE J. McNERNY, a citizen of the United States, residing at Chattanooga, in the county of Hamilton and State of Tennessee, have invented certain new and useful Improvements in a Brake Mechanism, of which the following is a specification.

This invention relates to automobile brakes and more specifically to that type of motor vehicle brakes which are operated from the engine exhaust.

One of the objects of my invention is to utilize a portion of the exhaust of certain cylinders of an internal combustion engine of a motor vehicle to supply a compression tank or reservoir and means to positively control the vehicle brakes by said exhaust.

A still further object of my invention resides in a motor vehicle brake system of the above type and auxiliary means for supplying air to a compression tank or reservoir from one of the cylinders when the motor is cut off.

Another and very important object of my novel brake mechanism resides in the provision of an auxiliary conduit for connection with the brakes of a trailer or trailers drawn by the motor vehicle and a valve control mechanism for regulating the pressure applied to the brakes.

Another object of my invention is directed to a brake mechanism and equalizer therefor supported in proximity to the rear axle of a worm driven vehicle whereby the braking power will not be affected by the load carried.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

In the accompanying drawings which form a part of the invention

Figure 1 is a plan view of the chassis of a motor vehicle with the brake mechanism applied.

Figure 2 is a fragmentary view showing the means of conducting the exhaust from the cylinders.

Figure 3 is a fragmentary detail of the steering wheel and the valve mechanism for controlling the air under pressure.

Figure 4 is a plan of valve detached from the steering wheel.

Figures 5, 6, and 7 are details of the valve in different positions.

Figure 8 is a section of a ball valve in the pipe conduit between the motor and reservoir.

Figure 9 is a detail of the brake cylinder.

Similar numerals in the specification refer to like or similar parts throughout the several views, in which, A conventional type of automobile or truck has a chassis 1, a rear axle with the usual casing 2, rear supporting wheels 3 and an engine 4 at the front of the machine provided with the spark plugs 5, three of which are provided with nipples communicating to the usual spark plug housings (not shown) all of which are positioned in the same general arrangement as shown and described in my copending application Serial No. 362,041 filed Feb. 28, 1920.

As shown in Figs. 1 and 2, short conduits 6, 7 are connected at one end with the spark plug housings and threaded at their opposite ends 8, 9 to a ball valve casing 10 positioned below and centrally of the engine, the conduit 6 being supplied with a cut off valve 6ª.

Communicating with and extending from the ball valve casing 10 is a vertically disposed conduit 11, having an angle shaped extension 12 which is connected to and communicates with one of the cylinders of the motor. The vertical leg of the angle shaped extension 12 of the conduit 11 is provided with a check valve 13, and is also provided with a cutoff valve 13', which is positioned between the check valve 13 and the lower end of the vertical leg of the extension 12. The check valve 13 is provided for the purpose of closing the extension 12 to the cylinder with which it communicates, and is closed by back pressure from the other cylinders or by back pressure from the reservoir 18 when the cutoff valve 13' is moved to open position so that the conduit 11 can communicate with that cylinder with which it is connected. The cut-off valve 13', normally is in closed position, and under such conditions the conduit 12 is normally closed to the cylinder with which it communicates. The purpose of the conduit 11, check valve 13 and cut-off valve 13' will be further referred to.

Communicating with and extending from the casing 10, is the depending extension 16, of a longitudinally disposed conduit 15, which communicates with a fluid pressure reservoir 18, situated below and positioned rearwardly with respect to the steering column of the vehicle.

The valve casing 10 is of inverted U-shape and near one end of the top thereof the conduit 11 opens thereinto, and near the other end of the top thereof, extension 16 opens thereinto. Each of the legs of the casing 10, intermediate the ends thereof, is provided with a valve seat and the said seats are indicated at 21, 22. Associated with each of the valve seats, for the purpose of closing the lower portions of the legs of the casing 10 to the upper portion of said casing, is a pair of ball valves and which are indicated at 19, 20, the former associating with the seat 21 and the latter with the seat 22. The legs of the casing 10 are formed intermediate their ends with passages and which are indicated at 23, 24, and which are employed for establishing communication between the lower and upper portions of the legs when the valves 19 and 20 are shifted from their seats.

Arranged within the upper portion of the casing 10 and directly in the path of movement of the ball valves, are stops 20' for arresting the upward movement of said valves.

One of the legs of the casing 10 has the conduit 6 connected therewith and which opens into the lower portion of such leg below the valve seat 21 and the other of the legs of the casing 10 has connected to the lower portion thereof the conduit 7 which opens into said leg below the valve seat 22. The conduit 15, intermediate its ends, is provided with a check valve 25'.

As the valves 19 and 20 are arranged in the legs of the casing 10 and have their upward movement arrested by the stops 20', the conduit 11 is always in communication with the extension 16 of the conduit 15 and which is provided for by the upper portion of the casing 10. Reference is had to Figure 8. When the valves 19 and 20 are retained on their seats by back pressure from the reservoir 18, communication is shut off between the conduits 6 and 7 and the conduit 15.

As shown in Figure 1, the conduit 6 leads from one of the cylinders of the motor and the conduit 7 from another cylinder of the motor, and that the said conduits 6 and 7 open into the casing 10, and when the valves 19 and 20 are unseated, it will permit of the pressure to be conducted from the two cylinders, passed through the casing 10, into the conduit 15, through the check valve 25', and into the main reservoir 18, and which maintains the pressure under ordinary conditions in the reservoir 18 for braking purposes. The check valve 25' is a common ball check of a type commonly used on air or any other type of pressure retaining systems and is employed as an emergency check. Should the valves 19 and 20 in the casing 10, become unseated by carbon or other foreign matter, check valve 25' would retain the pressure in the reservoir 18. The location of the valves 19 and 20, is such distance from the cylinders and as the conduits 6 and 7 are of very small diameter, it is almost impossible for any raw gas to get through these conduits, as the compression pressure of the motor is not high enough to lift the checks that distance from the cylinder and the outcome is that the checks lift and permit pressure to go to the reservoir 18 only on the expansion stroke.

The conduit 11 which is provided with the extension 12, as before stated, has a check valve 13, positioned above the cut-off 13' and the location of the check valve and cut-off is so close to the motor as to permit the operator to keep the main reservoir charged at all times on long hills.

It will be seen from the above that the air and some gas from the carburetor and cylinders will be conveyed through the conducts 6, 7 and the ball valve and the communicating longitudinal conduit 15 to the compression tank or reservoir 18 where the gas under pressure is controlled by the operator and applied to the brake mechanism now to be described.

Again referring to Fig. 1, a brake cylinder 25 communicates with the reservoir through conduits 26, 27, a valve designated in its entirety by numeral 28 being interposed between the conduit 27 and the reservoir conduit 18. The usual pressure gage 30 in proximity to the steering column and seat of the operator indicates the pressure in the reservoir. The brake cylinder 25 is supported as at 30 by the harp 31 which is permanently bolted as at 32 to the axle, the said brake cylinder and harp being positioned below the drive shaft 33 so that the braking mechanism will not be affected by the load on the rear axle. The brake cylinder 25 has the usual piston 34 and connecting rod 35 which operates through the opening 36 to thrust the central roller carrying frame 37 connected to the rod 35 rearwardly. The usual spring 38 bearing against the piston and rear wall 39 normally resists its rearward movement and a vent port 40 in the rear wall 39 is provided for the obvious purpose.

The roller 40$^a$ supported by pins 41 in the frame 37 carries a cable 42 which is trained about oppositely positioned rollers 43, 44 rotatable on the side arms 45, 46 of the harp. The cable 42 extends rearwardly as at 47 to the usual brake rods 48, which are connected by forwardly extending members 50, 51 to a cross rod and foot operating lever (not shown) for applying the brakes.

The valve mechanism above referred to for controlling the gas under pressure to the brake cylinder, is preferably supported by the steering column 52, a split ring 53 bolted as at 54 permanently supporting an outwardly and upwardly extending arm 55 which carries a three way valve 56. A conduit 57 communicates with the passage 58 and as shown in Fig. 6 when the valve 56 is opened, the compressed gas from the reservoir will be directed to the passage 60 leading to the brake cylinder. A suitable hand control 61 rotates the three way valve in its seat 62, the said hand control being in proximity to the steering wheel 63 so that it may be conveniently operated without the driver removing his hands from the steering mechanism. The central passage 64 for the exhaust communicates with the three way valve and as shown in Fig. 7 when opened relieves the pressure from the brakes. Fig. 5 shows the valve in its neutral position, passage 58 from the reservoir and passage 60 to the brake cylinder being closed. Now when pressure is to be applied to the brakes, the valve is turned to the position shown in Fig. 6 and the direct communication with the brake cylinder is had. When it is desired to release the brakes, the valve is again turned to the position shown in Fig. 7 and the passage 60 communicates with the exhaust passage 64 and pressure is released from the brake.

Particular attention is directed to Fig. 2 where is shown the cut off valve 13′ operated by a lever 66 and connecting rod 67 having a hand hold 68 within easy reach of the driver. In coasting down long hills, the motor is generally cut off and stops firing and in order to supply air in this instance the valve 13′ is opened and air is supplied to and pumped from the cylinder to the reservoir. In this manner it will be seen that I provide means for supplying air and spent gases to the reservoir under all conditions when the machine is travelling.

Additional conduits 69, 70 extend rearwardly to a connection 71$^a$ to the brake mechanism for trailers (not shown) and it will be obvious that the mechanism may be controlled from the driver's seat in the above described manner. Leading from the reservoir 18 is a conduit 71, which terminates in a siren 73, at the front of the vehicle, and extended from the conduit 71 is a branch conduit 72 which terminates in a signal 74. The operation of the siren 73 is controlled by a valve 76 which is provided with a handle 75. By opening valve 76, through the medium of the handle 75, air will pass through the conduit 71 and operate the siren 73. The signal 74 is a small whistle and is operated in any suitable manner, preferably through the medium of a cord or cable, not shown, and the cable or cord is so arranged as to extend over the rear of the truck and into a trailer so as to permit any one riding on the trailer on the rear of the truck to notify the driver by giving two pulls on the cord or cable so as to operate the whistle 74. The whistle 74 can be eliminated if desired.

In the operation of the brake mechanism, as the engine is running, spent gases from the end cylinders will be led through conduits 6, 7 to the ball valve casing 10 and thence to the tank or reservoir 18. The conduit 11, check valve 13 and cut-off valve 13′ are used for emergency purposes for cutting in an additional cylinder to supply air to the reservoir 18 on long hills, and by this arrangement it is possible for a tractor or truck to handle any number of trailers travelling down hill when ordinary traffic is feasible and when the motor is running by the momentum of the truck but not firing with both gasoline and spark shut off. Should the operator find that the main reservoir pressure obtained from the cylinders with which communicate the conduits 6 and 7, is not high enough to efficiently handle the brakes, the cut-off valve 13′ is opened and in connection with that cylinder with which the conduit 11 communicates, a means is provided for supplying additional pressure to the reservoir 18, and in this connection the cylinder with the conduit 11 communicates, as well as those cylinders from which the conduits 6, 7 lead, operate as air pumps directly charging the reservoir 18, whereby the reservoir is charged with sufficient pressure to efficiently handle the brakes. The cut-off valve 13′ is only opened in the emergency referred to and furthermore is never opened when the motor is firing, as the cylinders with which communicate the conduits 6 and 7 are only required to supply the reservoir with the necessary pressure when the motor is firing. If now it becomes necessary to apply the brakes, the operator turns the lever 61 from its neutral position, Fig. 5, to its operating position indicated by Fig. 6 and the gas or air under pressure will be communicated to the brake cylinder 25. As the piston 34 connecting rod 35 and roller carrying frame 37 are thrust rearwardly, the cable 47 will actuate the brake rods 48 in the well known manner.

When it is desired to release the brakes the control 61 is turned to the position shown in Fig. 7 and the pressure is released through the exhaust 64 in the above described manner.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the United States is:—

What I claim is:

1. An apparatus for the purpose set forth comprising the combination with an internal combustion motor of a motor vehicle, of a fluid pressure operated brake mechanism, a fluid pressure reservoir, a control means for the supply of fluid pressure from said reservoir to said mechanism to operate the latter, a valve mechanism including a housing, a primary conduit leading from said housing to said reservoir and provided intermediate its ends with a check valve, an auxiliary conduit extending from one of the cylinders of the motor to said housing and permanently in communication with said primary conduit and normally closed to said cylinder, means for conducting the products of combustion from certain of the cylinders of said motor to said housing and communicating with said primary conduit through said housing for the passage of the products of combustion from said cylinders to said reservoir, and means for opening said auxiliary conduit to the said cylinder of the motor to provide for a supply of air to the reservoir when the motor is operated from the momentum of the vehicle and not firing, and said valve mechanism including means for closing communication between said primary conduit and said conducting means during the supply of air through said auxiliary conduit to said reservoir.

2. An apparatus for the purpose set forth comprising the combination with an internal combustion motor of a motor vehicle, of a fluid pressure operated brake mechanism, a fluid pressure reservoir, a control means for the supply of fluid pressure from said reservoir to said mechanism for operating the latter, a valve mechanism including a pair of valve elements, a primary conduit leading from said mechanism to said reservoir and provided with a check valve, a pair of conduits leading from certain of the cylinders of the motor for conducting the products of combustion from said cylinders to said valve mechanism and each having associated therewith one of said valve elements, and a cut-off valve mounted in one of the conduits of said pair of conduits, said primary conduit permanently communicating with said valve mechanism and further having communication between it and said pair of conduits controlled by said valve elements.

3. An apparatus for the purpose set forth comprising the combination with an internal combustion motor of a motor vehicle, of a fluid pressure operated brake mechanism, a fluid pressure reservoir, a control means for the supply of fluid pressure from said reservoir to said mechanism for operating the latter, a valve mechanism including a pair of valve elements, a primary conduit leading from said valve mechanism to said reservoir and provided with a check valve, a pair of conduits leading from certain of the cylinders of the motor for conducting the products of combustion from said cylinders to said valve mechanism and each having associated therewith one of said valve elements, a cut-off valve mounted in one of the conduits of said pair of conduits, said primary conduit communicating with said pair of conduits through said valve mechanism and further having such communication controlled by said valve elements, an auxiliary conduit leading from said valve mechanism to another of the cylinders of the motor and permanently communicating with said primary conduit and normally closed to the said cylinder, and means for opening said auxiliary conduit to the said cylinder to provide for the supply of air to the reservoir from the said cylinder when the motor is operated from the momentum of the vehicle and not firing.

4. An apparatus for the purpose set forth comprising the combination with the motor of a motor vehicle, said motor including a series of cylinders, of a valve mechanism including a housing provided with a pair of ball valves, conduits connecting certain of the cylinders of the motor with said housing for conducting spent gases to the housing when the motor is firing, a fluid pressure reservoir opening into said housing, a brake cylinder, a conduit connecting said brake cylinder with said reservoir, a valve interposed between said brake cylinder and reservoir for controlling the fluid from the reservoir to said cylinder, and an auxiliary valved conduit leading from said housing and communicating with one of the cylinders of the motor for supplying air to said reservoir through said housing when the motor is operated from the momentum of the vehicle and not firing.

5. An apparatus for the purpose set forth comprising the combination with the motor of a motor vehicle, said motor including a series of cylinders, of a fluid pressure reservoir, a controlling means for the supply of fluid pressure from said reservoir to said mechanism for operating the latter, a valve mechanism including a housing provided with a pair of ball valves, a primary conduit leading from said housing to said reservoir and provided with a check valve, a pair of conduits leading from the ends of said housing to certain of the cylinders of the motor for conducting the products of combustion from the said cylinders to said housing and each having associated therewith one of said ball valves, and said primary conduit permanently communicating through said housing with said pair of conduits and having such communication controlled by said ball valves.

In testimony whereof, I affix my signature hereto.

CLYDE JOHN McNERNY.